Sept. 12, 1961 R. E. BARNES 2,999,980
AUTOMATIC BATTERY TESTER
Filed Feb. 14, 1958
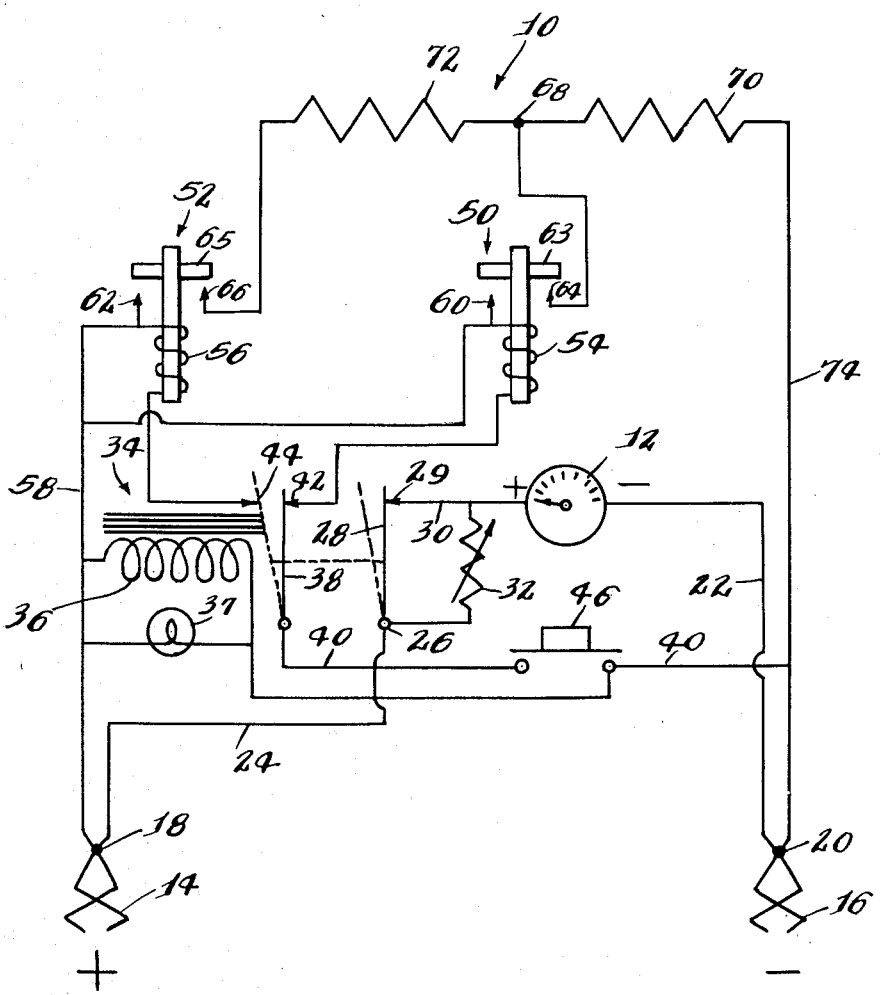
Inventor.
Robert E. Barnes.
By. Zabel, Baker, York, Jones & Dithmar
Attorneys.

2,999,980
AUTOMATIC BATTERY TESTER
Robert E. Barnes, 114 E. Grove St., Algona, Iowa
Filed Feb. 14, 1958, Ser. No. 715,311
2 Claims. (Cl. 324—29.5)

This invention relates to a device for determining the condition of a battery, and more particularly to a device for testing both 6 and 12 volt batteries by following identical operating procedures.

The recent trend toward the use of 12 volt storage batteries in automobiles has created problems for the serviceman because large numbers of cars still use the 6 volt ignition system, so that the serviceman must be able to check either of them. One way to do this would be to provide separate voltage testers for use with each kind of battery, but such a solution is objectionably expensive and in addition it raises the possibility of errors arising through the accidental use, for example, of a 6 volt battery tester on a 12 volt battery. Such an error could cause serious damage to the tester and unnecessary expense to the serviceman.

Another approach to this problem might be to provide a voltmeter in combination with a device for use with both 6 and 12 volt batteries and provide a manual switch in order to set the device for the voltage shown by the voltmeter. This solution might be somewhat more economical than using two separate testers, but the chances for a damaging error in the operation of the controls would be even greater. Of course there is always the possibility that such damage could be minimized through the use of elaborate warning and protective means, but this would make the resulting device uneconomical.

What is needed therefore and comprises the principal object of this invention is a single battery capable of testing either 6 or 12 volt batteries, both under load and under no load conditions, without using any separate manually operated controls.

Another object of the invention is to provide a battery tester which is automatically controlled by the voltage on the battery being tested so it supplies the correct operating voltage for the voltmeter and the correct load for the battery, whereby the condition of batteries under load and no load conditions can be tested by following identical operating procedures.

Still another object of the invention is to provide a 6 and 12 volt battery tester for testing batteries under load and no load conditions which is foolproof in operation.

Yet another object of the invention is to provide a battery tester which is simple and economical to manufacture and durable in operation.

These and other objects of the invention will become apparent when read in the light of the accompanying specification and drawing.

The single figure of the drawing is a schematic diagram showing the circuit and the arrangement of the components comprising a battery tester constructed according to the principles of this invention.

Referring now to the drawing, the automatic battery tester indicated generally by the reference numeral 10 includes a voltmeter 12. A pair of spring clips 14 and 16 are provided for attachment to the terminals of the battery to be tested. These spring clips are integral with input voltage terminals 18 and 20. As seen in the drawing, the negative side of voltmeter 12 is connected directly to input voltage terminal 20 by wire 22. A lead wire 24 extends from positive terminal 18 and terminates at switch terminal 26 which forms a part of the voltmeter circuit. This terminal is electrically connected to a switch blade 28 which in one position engages a bypass contact 29. This bypass contact is connected to lead 30 which is connected to the positive side of voltmeter 12. Terminal 26 is also connected to a variable multiplying voltmeter resistance 32 which is also connected to the positive side of voltmeter 12 to provide a current flow through the voltmeter when switch blade 28 moves to the dotted line position shown in the drawing.

With this arrangement, when switch blade 28 is in the position shown in solid lines, variable resistance 32 is shorted out or bypassed, and the voltmeter is connected across terminals 18 and 20, but when switch blade 28 moves to the dotted line position, then the current must flow through resistance 32 so that the voltage across voltmeter 12 is equal to the difference between the voltage across input terminals 18 and 20 and the voltage drop across multiplying resistance 32.

Since this battery tester is designated to test only batteries having 6 or 12 volts, voltmeter 12 can be selected so it gives a full scale deflection at 6 volts, and the value of the multiplying resistance 32 can be selected so that when a 12 volt battery is connected to the terminals 18 and 20, and the switch blade is moved to the dotted line position, then the voltage drop across this resistance will be about 6 volts. This means that the full range of the voltmeter scale is employed to indicate the condition of either 6 or 12 volt batteries.

A voltage discriminating relay switch indicated generally by the reference numeral 34 has a coil 36 which is connected across voltage input terminals 18 and 20 along with a pilot light or indicator 37. Relay switch 34 is preadjusted by conventional means (not shown) so that it is actuated by voltages as low as 9 or 10 volts. Thus when a 12 volt battery is being tested, the relay will actuate even if the true voltage of the battery is substantially lower than its design voltage. When this happens switch blade 28 automatically moves from the solid line position to the dotted line position as shown.

Switch blade 28 is connected to and movable with an additional switch blade 38. Switch blade 38 moves between separate contacts 42 and 44, and, depending on whether the voltage discriminating relay switch is actuated or not, engages one or the other of them. In addition, switch blade 38 is connected to one end of a wire 40 which goes through a push button switch 46, for reasons to be described below, and terminates at negative voltage input terminal 20.

The tester circuit also includes load control relays indicated generally by reference numerals 50 and 52. Each of these relays is provided with a coil 54 or 56 which is connected at one end to separate contacts 42 and 44 respectively. The opposite ends of these coils are connected to a line 58 which is directly connected to positive input terminal 18. With this arrangement, it can be seen that when switch blade 38 contacts terminal 42 and push button 46 is closed, then load control relay 50 is energized, and when the switch blade 38 contacts terminal 44, then load control relay 52 is energized. As stated above, however, the position of switch blade 38 depends upon whether or not voltage sensitive relay 34 is energized, and this in turn is controlled by the voltage at input terminals 18 and 20.

Load control relays 50 and 52 respectively include terminals 60 and 62 which are connected to the positive ends of coils 54 and 56. As seen, terminal 60 is electrically connected by a bar 63 to a terminal 64 whenever relay 50 is actuated, and terminal 62 is electrically connected by a bar 65 to a terminal 66 whenever relay 52 is actuated. Terminal 64 is connected to junction terminal 68 of voltmeter load resistances 70 and 72. The opposite end of load resistance 70 is connected to input terminal 20 through a line 74. The opposite end of load resistance 72 is connected to terminal 66.

In operation, when a 6 volt battery is being tested, the clips on input terminals 18 and 20 are connected to the corresponding terminals of the battery. Upon such connection, indicator lamp 37 lights up to indicate that the connections to the battery are conductive. Since the voltage (6±volts) across relay coil 36 is too low to actuate relay 34, current flows in the circuit comprising line 24 (bypassing resistance 32), voltmeter 12 and negative input terminal 20 to indicate the condition of the 6 volt storage battery when not under load. To test the condition of the battery under load, switch 46 is closed. This closes load control relay 50 and puts the correct 6 volt load resistance 70 in parallel with the voltmeter so that the voltmeter can indicate the condition of the battery under load conditions.

The test for a 12 volt battery is exactly the same. The clips 14 and 16 on input terminals 18 and 20 are connected to the terminals of the 12 volt battery. Upon such connection, indicator lamp 37 lights up to show that the connections to the battery are conductive. Since the voltage across relay coil 36 is sufficient to actuate the relay, switch blades 28 and 38 automatically move to their dotted line positions. When this happens current flows in the circuit comprising line 24, multiplying voltmeter resistance 32 (since switch blade 28 is open), voltmeter 12 and negative input terminal 20. As stated above, resistance 32 is preadjusted so that the full range of voltmeter 12 is effective to indicate the condition of the 12 volt battery under no load. To test the battery under load conditions, switch 46 is closed exactly the same way as before, but this time because relay 34 has been actuated, load control relay 52 will automatically close and put the correct load resistance in parallel with the voltmeter so that the voltmeter can indicate the condition of the 12 volt battery under load conditions. This load is the sum of resistances 70 and 72, as seen in the drawing. Since relay 34 is set to be actuated by voltages as low as 9 or 10 volts, it can be seen that the battery tester described above is effective even when a defect in the 12 volt battery causes a substantial voltage drop.

The invention may be embodied in other forms without departing from the spirit or essential characteristics thereof as set forth in the claims, and the present embodiment is therefore to be considered as illustrative and not restrictive, and it is intended to include all changes which come within the scope and range of the claims.

Having thus described my invention, what I claim as new and desire to secure by Letters Patent is:

1. An automatic battery tester for total battery voltage operable by following identical procedures on either a 6 volt battery or a 12 volt battery to provide a "no load" voltage test and a "load" voltage test utilizing the full range of the same voltmeter for each type battery, said tester comprising:

a pair of tester terminals adapted to be connected to a battery;

a dual purpose voltage discriminating relay switch connected between said tester terminals and including a pair of switch means, said relay switch non-responsive to a 6 volt battery and responsive to a 12 volt battery;

a voltmeter connected in series with one of said switch means between said tester terminals;

a multiplying resistance connected between said voltmeter and said one switch means whereby meter current traverses said multiplying resistance on 12 volt battery operation and bypasses same on 6 volt battery operation, thereby utilizing the full range of said voltmeter for either voltage condition and providing a "no load" voltage test;

a dual load circuit between said tester terminals, said dual load circuit including, a manual switch connected between one of said tester terminals and the other switch means of said voltage discriminating relay switch;

a 6 volt range load resistance;

means including said other switch means and responsive to closure of said manual switch connecting said 6 volt range load resistance between said tester terminals when said voltage discriminating relay switch is non-responsive;

a 12 volt range load resistance;

means including said other switch means and responsive to closure of said manual switch connecting said 12 volt range load resistance and said 6 volt range load resistance in series between said tester terminals when said voltage discriminating relay switch is responsive;

whereby when said manual switch is closed the proper load resistance for the battery under test automatically is connected in circuit with the battery, thereby providing a "load" voltage test utilizing the full range of said voltmeter.

2. An automatic battery tester for total battery voltage operable by following identical procedures on either a 6 volt battery or a 12 volt battery to provide a "no load" voltage test and a "load" voltage test utilizing the full range of the same voltmeter for each type battery, said tester comprising:

first and second tester terminals adapted to be connected to a battery;

a voltage discriminating first relay switch including a first relay coil connected between said tester terminals, a first movable switch blade and a cooperating first switch contact, and a second movable switch blade and cooperating second and third switch contacts, said first and second blades operable together and respectively engaging said first and second contacts when the voltage on said first relay coil is below a predetermined value between 6 and 12 volts, said first blade withdrawn from said first contact and said second blade engaging said third contact when said relay switch responds to a voltage above said predetermined value, said first blade connected to said first tester terminal;

a voltmeter having one terminal connected to said second tester terminal and its other terminal connected to said first switch contact;

a multiplying resistance connected between said first switch contact and said first switch blade whereby at a voltage on said relay coil below said predetermined value the meter current passes through said first blade and bypasses said multiplying resistance and at a voltage above said predetermined value passes through said resistance thereby utilizing the full range of said voltmeter for either voltage condition and providing a "no load" voltage test;

a load circuit connected between said tester terminals, said load circuit including, a manual switch connected between said second tester terminal and said second switch blade;

load controlling second and third relay switches respectively including second and third relay coils, one end of said second relay coil connected to said second switch contact and one end of said third relay coil connected to said third switch contact, the other ends of said second and third relay coils connected together and to said first tester terminal;

a 6 volt range load resistance connected in series with said second relay switch between said first and second tester terminals;

a 12 volt range load resistance connected in series with said 6 volt range load resistance and said third relay switch between said first and second tester terminals;

whereby when said manual switch is closed the proper load resistance for the battery under test automatically is connected in circuit with the battery, thereby providing a "load" voltage test utilizing the full range of said voltmeter.

References Cited in the file of this patent

UNITED STATES PATENTS

| | | |
|---|---|---|
| 2,229,009 | Berry | Jan. 14, 1941 |
| 2,400,190 | Clark | May 14, 1946 |
| 2,517,638 | Decker | Aug. 8, 1950 |
| 2,689,939 | Godshalk | Sept. 21, 1954 |
| 2,758,275 | Medlar | Aug. 7, 1956 |
| 2,782,357 | Heyer et al. | Feb. 16, 1957 |
| 2,791,749 | Godshalk et al. | May 7, 1957 |